US005565229A

United States Patent [19]
Mandle

[11] Patent Number: 5,565,229
[45] Date of Patent: Oct. 15, 1996

[54] PRESS AND METHOD FOR TIE-DYEING EGGS

[75] Inventor: James S. Mandle, Woodclliff Lake, N.J.

[73] Assignee: Schering-Plough HealthCare Products, Inc., Memphis, Tenn.

[21] Appl. No.: 359,990

[22] Filed: Dec. 20, 1994

[51] Int. Cl.$^{6}$ .......... A23L 1/27
[52] U.S. Cl. .......... 426/250; 426/302; 8/506
[58] Field of Search .......... 425/395, 408, 425/409, 118, 116; 206/521.2, 590, 592; 118/26, 503, 505, 406; 8/506; 426/298, 250, 104, 383, 300, 302, 249

[56] References Cited

U.S. PATENT DOCUMENTS

| | | | |
|---|---|---|---|
| D. 363,496 | 12/1995 | Mandle . | |
| D. 363,497 | 12/1995 | Mandle . | |
| 545,567 | 9/1895 | Baker | 206/521.1 |
| 1,538,367 | 5/1925 | Young . | |
| 1,829,689 | 12/1931 | Townley et al. . | |
| 1,935,901 | 11/1933 | Augenblick . | |
| 1,952,612 | 3/1934 | Sherwood . | |
| 1,967,040 | 7/1934 | Pickett | 206/521.1 |
| 1,982,820 | 12/1934 | Lowenstein . | |
| 2,009,874 | 7/1935 | Cauley | 206/521.1 |
| 2,078,488 | 4/1937 | Farnham | 206/521.1 |
| 2,134,908 | 11/1938 | Copeman | 206/592 |
| 2,199,201 | 4/1940 | Heden . | |
| 2,593,566 | 4/1952 | Kamp . | |
| 3,311,231 | 3/1967 | English | 217/26.5 |
| 3,381,873 | 5/1968 | Hirota | 206/521.1 |
| 3,745,973 | 7/1973 | Knecht . | |
| 3,848,564 | 11/1974 | Kull . | |
| 3,988,834 | 11/1976 | Anderson . | |
| 4,181,745 | 1/1980 | Growe et al. . | |
| 4,370,941 | 2/1983 | Belton . | |
| 4,371,555 | 2/1983 | Tully . | |
| 4,419,103 | 12/1983 | Balkan . | |

(List continued on next page.)

FOREIGN PATENT DOCUMENTS 447194 3/1933 United Kingdom .

OTHER PUBLICATIONS

Sue Anne Pressley, Golden Eggs Aren't All That Glitter, The Washington Post, Apr. 17, 1992, Final Edition, Section METRO, p. b01.
Susan Doerfler, Taking a Dip Tie–Dyed Easter Egg Designs Embellish Run —of–the–Mill Shell, Arizona Republic, Sunday Apr. 5, 1987, Final Section: Sun Living p. S15.
Joan Cirllo, Ester Egg Decorating Fun, Delight for Children by Using Various Techniques, You'll Have Plenty to Give to Friends, Relatives or For Holiday Centerpieces, Rocky Mountain News (RM), Tuesday Apr. 14, 1992, Final Section: Special Pullouts p. 28.
Joan Cirrillo, Easter Egg Excitement, Oregonian, Tuesday Mar. 26, 1991, Fourth Section: Food Day P. FD16–OP.
Joan Cirrillo, Try Something Novel With Easter Eggs, Akron Beacon Journal, Wednesday Mar. 37, 1991, 1 Star Edition, Section Life Style, p. E4.
New in the Kitchen Make Designer Easter Eggs, The Tie–Dyed Way, Atlanta Journal, Thursday Apr. 5, 1990, Section Food, p. W02.
Joan Cirrillo, Colored Eggs Can Be Really Spe–Shell, Daily News of Los Angeles, Sunday Apr. 12, 1992, Valley Edition, Section Food, p. H6.

(List continued on next page.)

*Primary Examiner*—Brenda A. Lamb
*Attorney, Agent, or Firm*—Joseph T. Majka; Cynthia L. Foulke

[57] ABSTRACT

A press and a method for using the press to tie-dye eggs is claimed. The press comprises a planar material having a surface; a center fold line essentially dividing said planar material into two parts, each part having in the surface of said planar material, a depression such that when the planar material is folded along said centerfold line, the two depressions align to define a closed void that is substantially egg-shaped; each depression further having at least one predetermined locus for puncturing.

15 Claims, 4 Drawing Sheets

U.S. PATENT DOCUMENTS

| | | | |
|---|---|---|---|
| 4,531,475 | 7/1985 | Thill . | |
| 4,573,586 | 3/1986 | Helmer . | |
| 4,599,235 | 7/1986 | Miller et al. . | |
| 4,664,925 | 5/1987 | McShane . | |
| 4,693,205 | 9/1987 | Thill . | |
| 4,798,162 | 1/1989 | Nelson . | |
| 4,842,143 | 6/1989 | McKee, Sr. et al. | 206/521.1 |
| 4,853,240 | 8/1989 | McShane . | |
| 4,967,687 | 11/1990 | McShane . | |
| 5,063,871 | 11/1991 | Chambers . | |
| 5,074,239 | 12/1991 | Law . | |
| 5,164,009 | 11/1992 | Chandler . | |
| 5,348,766 | 9/1994 | Latham . | |

OTHER PUBLICATIONS

Joan Cirrillo, Household Items Can Be Used in Distinctive Egg Decorations, Lexington Herald Leader (LH), Wednesday Mar. 27, 1991, Final Section, Lifestyle—Food p. E8.

Hard–Boiled Happiness a Basketball of Egg Ideas, Dayton Daily News(DA), Tuesday Mar. 26, 1991, City Edition, Lifestyle P. 1C.

Joan Cirrillo, Make Easy Work of Extraordinary Easter Eggs, Fresno Eggs, Fresno Bee, Wednesday Mar. 27, 1991, Home Edition, Section Food, p. GG2.

PRESS AND METHOD FOR TIE-DYEING EGGS

BACKGROUND

Coloring eggs has been an Eastern custom among many religious and national groups. In the United States, the art of decorating Easter eggs is a well-known annual activity which is enjoyed by many people. Tie-dyeing is a coloring process which can impart an intricate, aesthetic design to an article. The article by Susan Doerfler, "Taking a Dip-Tie Dyed Easter Egg Design Embellish Run-of-the Mill Shell," The Arizona Republic, Sunday, Apr. 5, 1987, describes a method of tie-dyeing eggs by inserting the egg into a nylon stocking and immersing the egg/stocking in a bowl of dye. Although effective, this method has the disadvantage of not being able to control, in fine detail, the patterns and colorations on the egg surface. Another disadvantage of this method is the difficulty of applying multiple colors to an egg at selected locations on the egg surface. Further, this method can be rather messy, since the user's hands can become discolored with dye by handling the bowl and the dye-wetted nylon stocking. Accordingly, it would be desirable to provide a device and a method for tie-dyeing eggs which overcomes such disadvantages.

SUMMARY OF THE INVENTION

In one embodiment, the present invention is directed toward a device or press for tie-dyeing eggs, comprising:

a planar material having a surface;

a center fold line essentially dividing said planar material into two parts, each part having in the surface of said planar material, a depression such that when the planar material is folded along said centerfold line, the two depressions align to define a closed void that is substantially egg-shaped;

each depression further having at least one predetermined locus for puncturing. The predetermined locus can impressed into the surface of each depression, can be X-shaped, can be punctured through the depression or any combination of the above.

Preferably, the press has means on its surface for securing the two parts in place to substantially maintain the shape of said closed, egg-shaped void. Also preferred is that the securing means is integrally part of the planar material.

Also preferred is that the planar material has side walls capable of supporting the planar material and each depression, wherein one end of the side wall is attached to the planar material and the other end of the side wall has a base. The side walls can be positioned at any angle to the planar surface, preferably substantially perpendicular to the planar surface. The side wall can two lines which extend from each end of the centerfold line to the base of the side wall. These lines, when cut, enable the planar material to be folded along the centerfold line.

In another embodiment, the present invention is directed toward a method for tie-dyeing an using the egg press described above. In this embodiment, each depression has at least one predetermined locus which is punctured and a fabric wick overlays the surface of each depression and the fabric wick partially protrudes through the puncture. The method comprises the steps of:

a) inserting an egg atop the fabric wick in one of the depressions;

b) closing the two parts of the dye press so that the egg is in intimate contact with said fabric wick;

c) applying coloring dye to the fabric wick protruding through said puncture; and d) opening said two parts and removing the tie-dyed egg from said press.

One advantage of the present invention is that it provides a press and a method for tie-dyeing which would allow the user to control, in finer detail, patterns and colorations on the egg surface.

A second advantage of the present invention is that it provides a press and a method for easily applying multiple colors to an egg at selected locations on the egg surface.

A third advantage of the present invention is that it provides a press and a method for dyeing eggs that would protect the hands from inadvertent dye coloration.

A fourth advantage of the present invention is that it provides a press which is easy to use and reusable.

DETAILED DESCRIPTION OF THE INVENTION

The terms "eggs" as used herein means intact, unbroken eggs, preferably chicken eggs. The eggs used in the foldable egg tie-dye press of the present invention should be light colored, preferably white. Prior to use in the egg press, the eggs should be hard-boiled, i.e.. cooked in the shell in hot or boiling water until both white and yolk have solidified, in a vessel which minimizes discoloration of the egg surface. In one procedure, eggs are placed in a single layer in a pot, enough water is added to the pan to cover the eggs by an inch, the pot is covered and the water is quickly brought to a boil. The pot is removed from the heat source so that the water no longer boils and the eggs stand in the hot water for about 15 to 17 minutes. Cold water is run over the eggs until they are cooled. Suitable vessels include stainless steel or glass pots or pans, or vessels having an interior or enamel or glass coating. Vessels or pans made of aluminum or iron should be avoided. Preferably, the vessel and the water used for hard-boiling should be oil- and detergent-free. No oil or detergent should be added to the vessel or water used for boiling. After the eggs are hard boiled, the heated eggs should be cooled by flushing the vessel with cold water.

The coloring dyes used for coloring the eggs are well known and readily available commercially. The number of coloring dyes used with the present press can vary from two to six dyes or more. Suitable dyes include water-soluble dyes approved by the Food and Drug Administration (FDA) and conventionally used to color eggs, including red, yellow, blue, brown, orange, green, pink, chartreuse or combinations of the above. Prior to use, the coloring dyes can be dissolved in a dilute acid, such as vinegar, in separate containers to provide one coloring dye per container. Since tie-dyeing requires a more concentrated dye solution to provide the contrasting colorations, the dilute acid and/or water can be added in amounts which just dissolves the coloring dye. If more liquid is needed, small amounts of water can be added to slightly dilute the concentrated dye solution. More water can be added if eggs are to be dyed traditionally, i.e.. dyeing the whole egg to a single color.

The fabric wick can be make of any material which allows the coloring dye solution to diffuse into fabric wick and onto the egg, causing a tie-dye coloration on the egg surface. Suitable fabric wicks include natural or synthetic fabrics, preferably natural fabrics. Suitable natural fabrics include cotton, wool and felt. Suitable synthetics include nylon, polyester and polypropylene.

The press can be made of any suitable material such as wood or any polymer which allows convenient manufacturing of the press, including polypropylene, polypropylene, polystyrene or polyvinyl chloride.

DETAILED DESCRIPTION OF THE DRAWINGS

Figure 1:
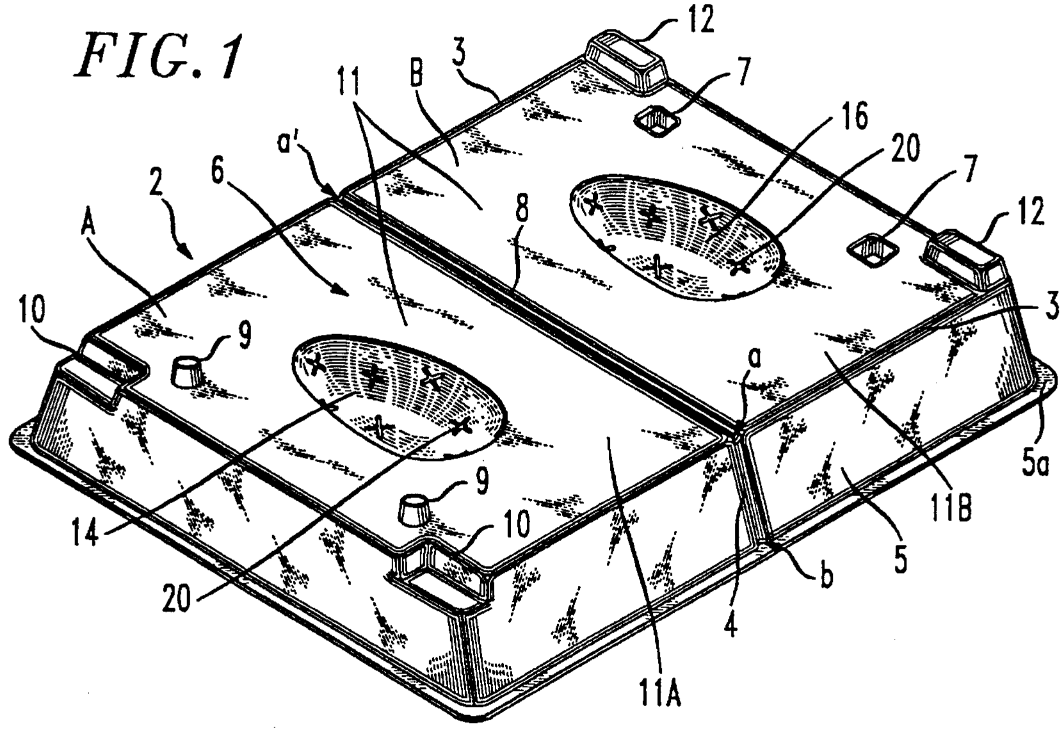
FIG. 1 is a top perspective view of a Foldable Egg Tie-Dye Press 2 prior to receiving cuts allowing it to fold, as shown in FIG. 2.
Figure 2:
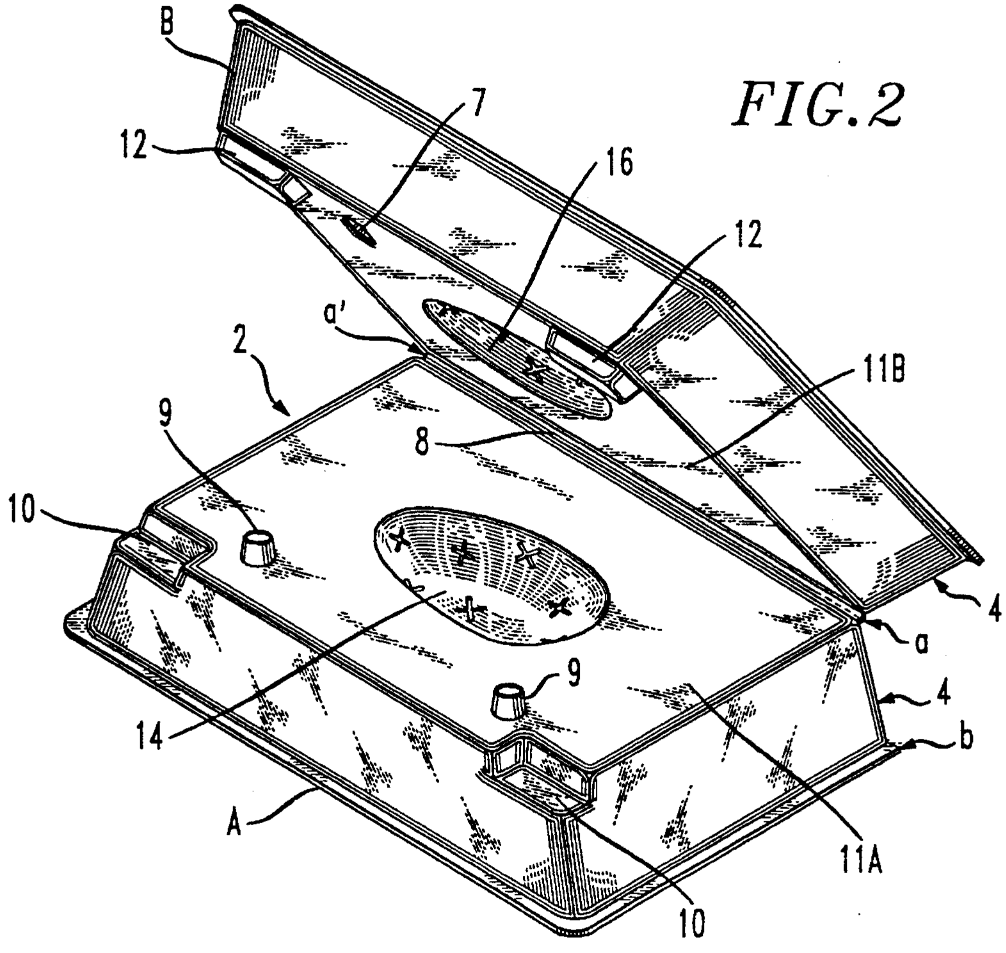
FIG. 2 is a top perspective view thereof, showing it in a foldable configuration.

In FIG. 1, egg press 2 is comprised of planar material having surface 11 and a center fold line 8 extending between points a' and a. Center fold line 8 divides planar material 11 into two parts, parts A and B, having planar surfaces 11A and 11B, respectively. Part A has depression 14 in its planar surface 11A, and part B has depression 16 in its planar surface 11B. In this embodiment, press 2 also has side wall 5 which is capable of supporting planar material 11 and depressions 14 and 16. One end of side wall 5 is contiguously attached to planar material 11 at edge 3, while the other end of side wall 5 is constructed to serve as a base **5*a*. Side wall 5 can be at any suitable angle to planar surface 11 and preferably is substantially perpendicular the planar surface. A line 4 on side wall 5 extends from one end of center fold line 8 at point a and extends to point b on base 5*a* of side wall 5. A corresponding side wall line 4 also extends from the other end of center fold line 8 at point a' to point b' (not shown) on base 5*b*. Using a knife or scissors, cuts are made between points a–b and a'–b' to allow parts A and B to fold along centerfold line 8, as shown in FIG. 2. Press 2 also has projections 9 and 12 with receivers 7 and 10, shown here as integral parts of surfaces 11A and 11B of egg press 2**.

Figure 5:
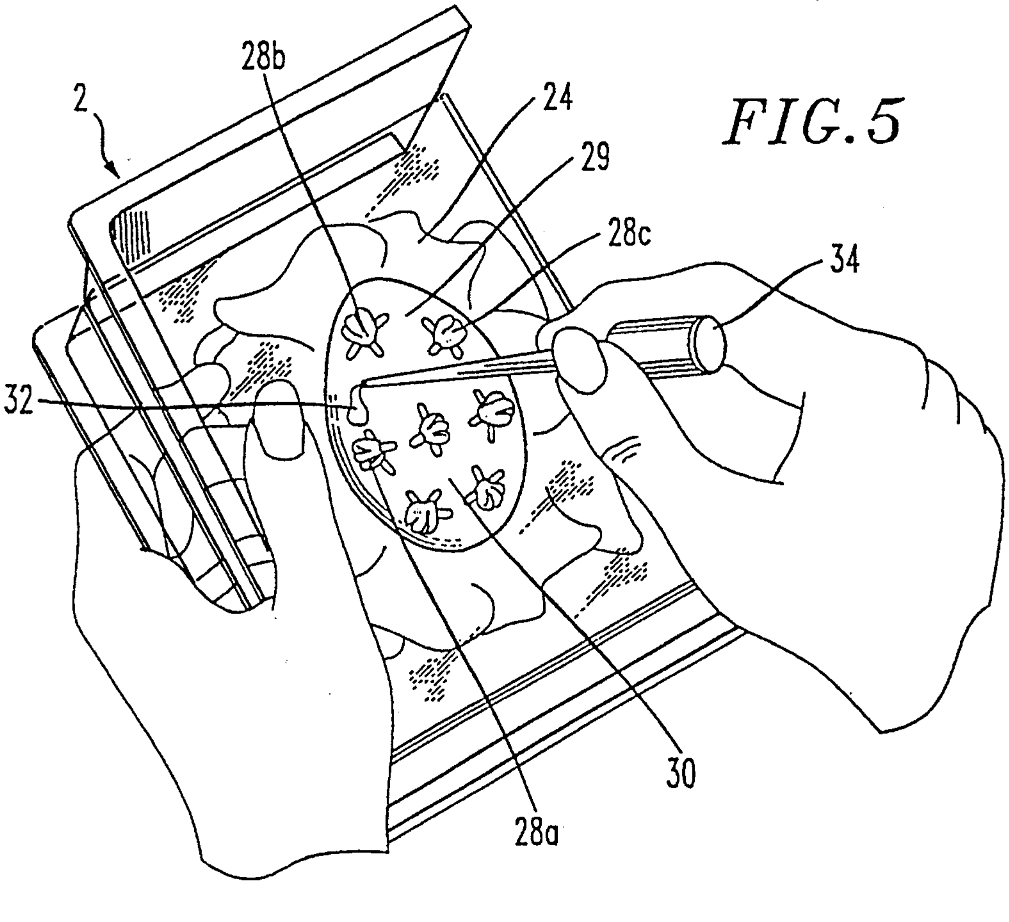
FIG. 5 shows a folded press 2 holding an egg and fabric wick in which a dropper is used to apply coloring dye to the fabric wick.

FIG. 2 shows how the cuts between points a–b and a'–b' allow parts A and B of egg press 2 to fold along line 8. When Parts A and B are completed folded, depressions 14 and 16 align to define a closed void 29 that is substantially egg-shaped. When parts A and B are completely folded together so that planar surfaces 11A and 11B meet, projections 9 and 12 and receivers 7 and 10 can be interlocked to secure parts A and B in place to substantially maintain the shape of the closed, egg-shaped void 29, as shown in FIG. 5. Preferably, the centerfold line along which parts A and B fold is left intact, to provide convenient handling of the egg. However, in another embodiment of the present invention, the centerfold line 8 can be cut, so that parts A and B are separated and do not fold along a common edge. Where centerfold line 8 is cut or separated, parts A and B can be securely held in place and depressions 14 and 16 aligned to form and define egg-shaped void 29, through the use of additional means for clamping parts A and B, such as external or intrinsic clamps, receivers and/or projections.

Figure 3:
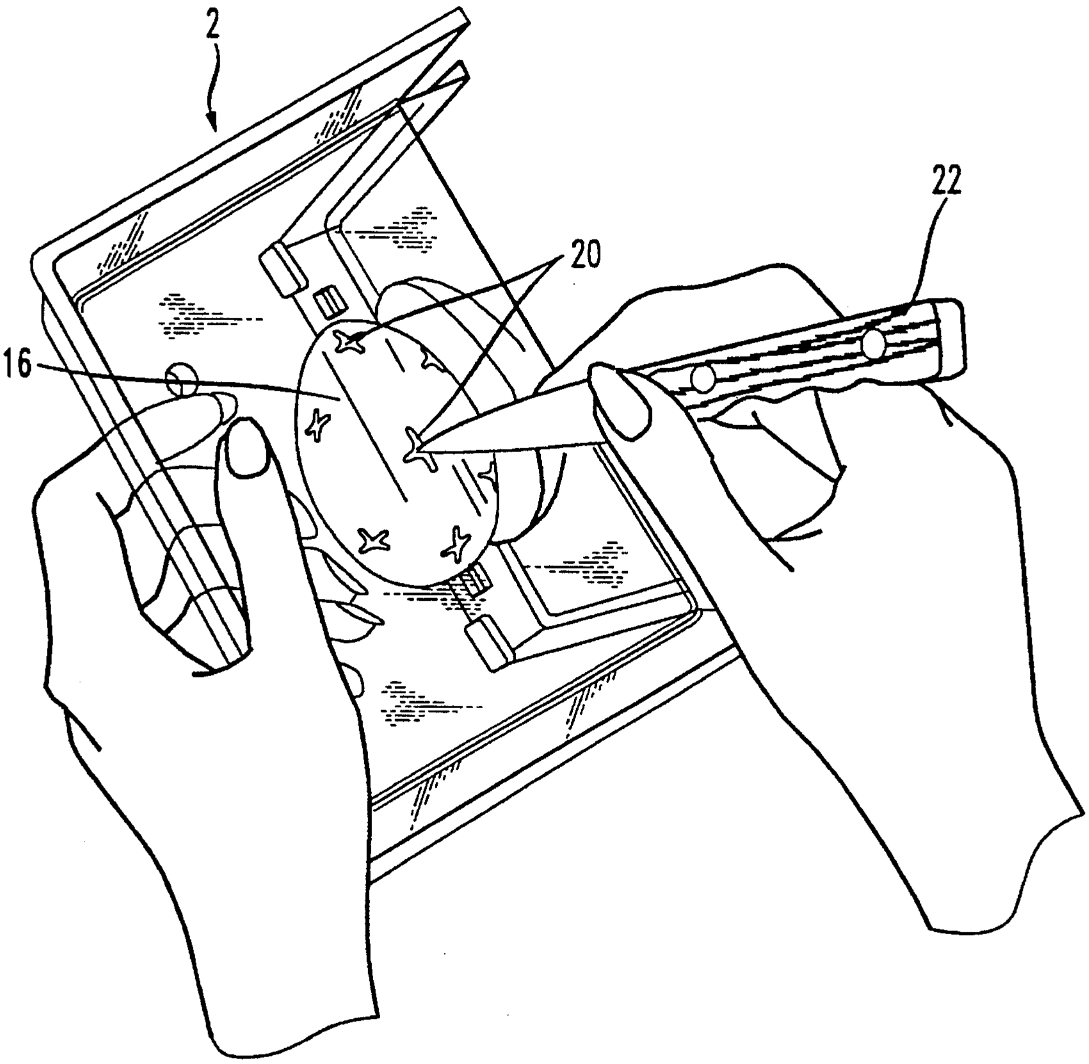
FIG. 3 shows the puncturing of X-shaped impressions with a knife.

FIG. 3 shows multiple raised "X" or star-type impressions 20 having a predetermined locus throughout the surface of egg receiving depressions 14 and 16 of egg press 2. In this embodiment, impressions 20 are symmetrically arranged or arranged in a radial manner. A knife 22 is used to puncture through each "X" impressions to create "X" shaped punctures in depressions 14 and 16. Alternatively, press 2 can be molded so that "X" or star-type impressions are already punctured (i.e.. pre-formed) through the surface of depressions 14 and 16.

Figure 4:
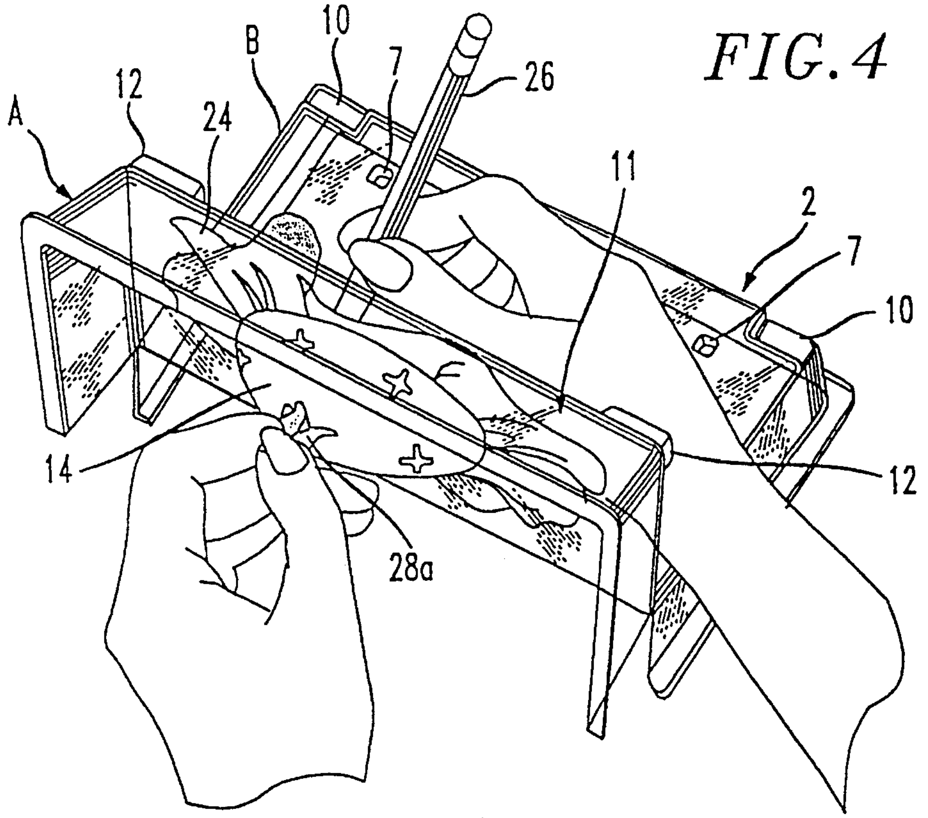
FIG. 4 shows protruding a small portion of the fabric wick placed atop protrusion 14.

FIG. 4 shows how in press 2, sheet 24 of either a dry or a damp fabric, preferably a dry fabric, is placed on surface 11A and 11B of parts A. To create tie-dye designs, a dull object, such as a blunted pencil 26, can be used to poke fabric sheet 24 through the "X" shaped punctures, and a portion of fabric sheet 24 is pulled to the outside of egg receiving depressions 14 and 16, forming fabric wick or protrusion **28*a* as shown. Afterwards, another sheet 24 (not shown)is placed on surface 11B of part B, and handled as described for the sheet for part A, above. A white or traditionally colored hard boiled egg 30 is placed atop the fabric sheet 24, now partially protruding through depressions 14 and 16, and parts A and B are folded together so that the egg is in intimate contact with the fabric wick. Optionally and preferably, projections 9 (not shown) and 12 are interlocked with receivers 7 and 10**, respectively.

FIG. 5 shows a folded press 2 securely holding a white or traditionally colored egg 30 in closed egg-shaped void 29. Dropper 34 is used to apply drops of a concentrated coloring dye solution 32 to fabric wick **28*a*. Dye solution 32 diffuses into fabric wick and onto egg 30, causing a tie-dye coloration on the egg surface. After varying colored dye solutions have been applied to the remaining fabric wicks, i.e.. 28*b*, 28*c*, etc., parts A and B are opened, the tie-dyed egg is removed from egg press 2** and placed in a suitable tray to dry.

Figure 6:
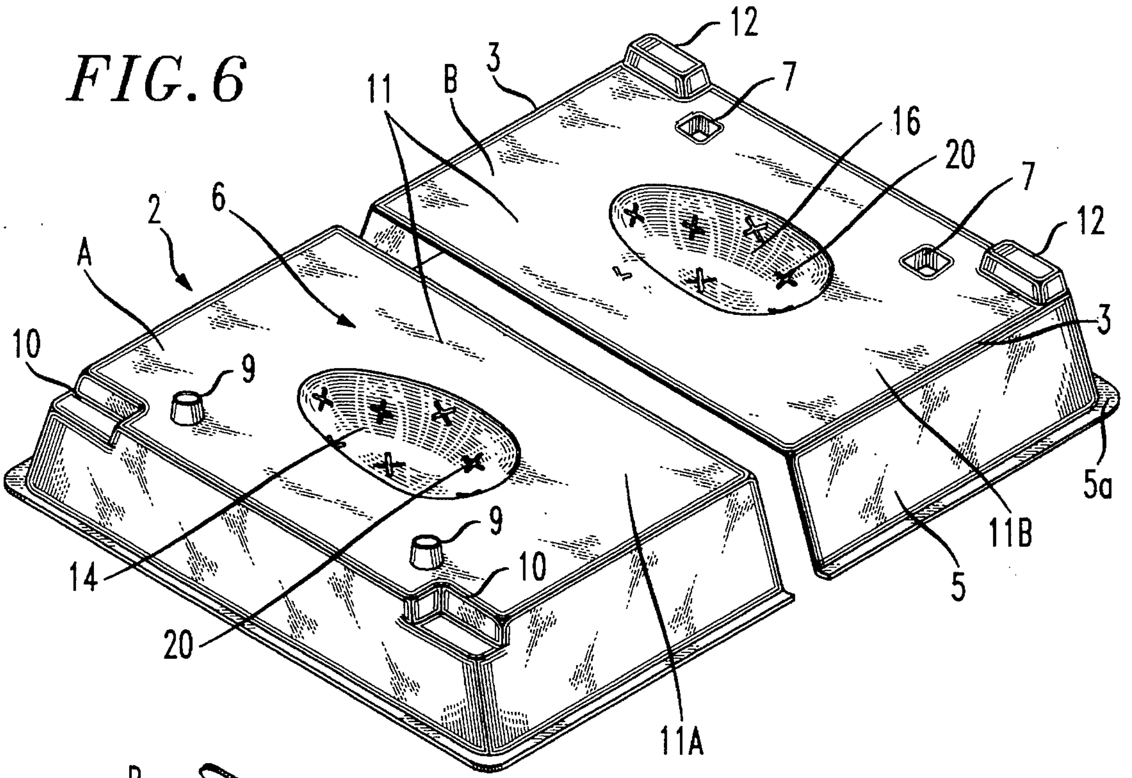
FIG. 6 is a top perspective view of an Egg Tie-Dye Press 2 in which parts A and B are separated.

In FIG. 6, egg press 2 is comprised of parts A and B, having planar surfaces 11A and 11B, respectively. Part A has depression 14 in its planar surface 11A, and part B has depression 16 in its planar surface 11B. In this embodiment, press 2 also has side wall 5 which is capable of supporting planar material 11 and depressions 14 and 16. One end of side wall 5 is contiguously attached to planar material 11 at edge 3, while the other end of side wall 5 is constructed to serve as a base **5*a*. Side wall 5 can be at any suitable angle to planar surface 11 and preferably is substantially perpendicular the planar surface. Press 2 also has projections 9 and 12 with receivers 7 and 10, shown here as integral parts of surfaces 11A and 11B of egg press 2. Multiple raised "X" or star-type impressions 20 having a predetermined locus throughout the surface of egg receiving depressions 14 and 16 of egg press 2** are shown.

Figure 7:
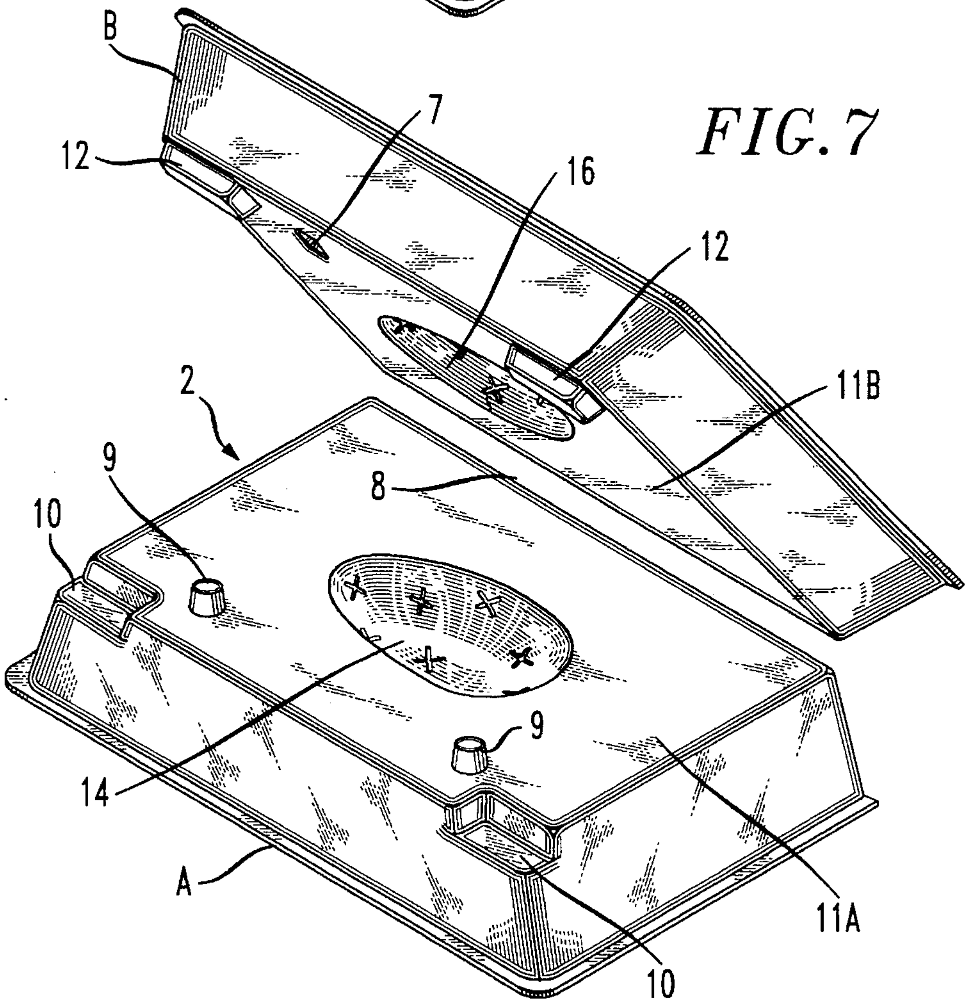
FIG. 7 is a top perspective view of the Press 2 in FIG. 6, showing the partial alignment of Parts A and B.

FIG. 7 shows the partial alignment of parts A and B of egg press 2. When parts A and B are fully aligned so that planar surfaces 11A and 11B meet, projections 9 and 12 and receivers 7 and 10 can be interlocked to secure parts A and B in place, and depressions 14 and 16 define the shape of a closed void 29 that is substantially egg-shaped, as shown in FIG. 5. Parts A and B can be securely held in place through the use of additional means for securing or clamping parts A and B, such as external or intrinsic clamps, receivers and/or projections.

What is claimed is:

1. A press for tie-dyeing an egg, comprising:

a planar material having a surface;

a center fold line essentially dividing said planar material into two parts, each part having in said surface of said planar material, a partially egg-shaped depression such that when said planar material is folded along said centerfold line, the two depressions align to define a closed void that is substantially egg-shaped;

each depression further having at least one defined locus on its partially egg-shaped portion for puncturing, and a wick adaptable to contact said partially egg-shaped depression, wherein said wick can partially protrude through a puncture defined by said locus and outside of the partially egg-shaped depression so that dye may be applied to the wick and onto the egg.

2. The press as claimed in claim 1 wherein said defined locus is impressed into the surface of each depression.

3. The press as claimed in claim 2 wherein said impressed, locus is X-shaped.

4. The press as claimed in claim 1 wherein said defined locus is a puncture.

5. The press as claimed in claim 4 wherein said puncture is X-shaped.

6. The press as claimed in claim 1 further comprising means on said surface for securing said two parts in place to substantially maintain the shape of said closed, egg-shaped void.

7. The press as claimed in claim 6 wherein said securing means are integrally part of said planar material.

8. The press as claimed in claim 6 further comprising side walls attached to and capable of supporting said planar material and each depression, wherein one end of the side wall is attached to said planar material and the other end of said side wall has a base.

9. The press as claimed in claim 8 wherein said side walls are substantially perpendicular to said planar material.

10. The press as claimed in claim 8 wherein said side wall has a line which extends from one end of said centerfold line to the base of said side wall.

11. The press as claimed in claim 1 is made of polypropylene or polyethylene or polystyrene.

12. The press as claimed in claim 1 further comprising means for securing said two parts and aligning said two depressions.

13. Method for tie-dyeing an egg, using a press comprising the structural elements of:

a planar material having a surface;

a centerfold line essentially dividing said planar material into two parts, each part having in said surface of said planar material, a depression such that when said planar material is folded along said centerfold line, the two depressions align to define a closed void that is substantially egg-shaped; each depression further having at least one defined locus which is punctured, wherein a wick overlays the surface of said depression and said wick partially protrudes through said puncture, wherein said method comprises the steps of a) inserting an egg atop the wick in one of said depressions;

b) closing the two parts of said press so that the egg contacts said wick;

c) applying coloring dye to said wick protruding through said puncture; and d) opening said two parts and removing the tie-dyed egg from said press.

14. A press for tie-dyeing an egg, comprising:

two separate planar materials having a surface wherein each planar material is defined as a part;

each part having in said surface of said planar material, a partially egg-shaped depression such that said two depressions align to define a closed void that is substantially egg-shaped;

each depression further having at least one defined locus on its partially egg-shaped portion for puncturing, and a wick adaptable to contact said partially egg-shaped depression, wherein said wick can partially protrude through a puncture defined by said locus and outside of said partially egg-shaped depression so that dye may be applied to said wick and onto the egg.

15. The press as claimed in claim 14 further comprising means for securing said two parts and aligning said two depressions.

* * * * *